United States Patent [19]

VanGerpen

[11] Patent Number: 5,101,909
[45] Date of Patent: Apr. 7, 1992

[54] BENDING SHAFT DRAFT FORCE SENSOR

[75] Inventor: Harlan W. VanGerpen, Cedar Falls, Iowa

[73] Assignee: Deere & Company, Moline, Ill.

[21] Appl. No.: 611,628

[22] Filed: Nov. 13, 1990

[51] Int. Cl.⁵ .......................................... A01B 63/112
[52] U.S. Cl. ..................................... 172/7; 73/862.57
[58] Field of Search ........... 73/862.57, 862.62, 862.64; 172/2, 7, 10, 8, 9, 11, 12; 280/446.1

[56] References Cited

U.S. PATENT DOCUMENTS

| | | |
|---|---|---|
| 2,864,295 | 12/1958 | DuShane . |
| 2,974,733 | 3/1961 | Fletcher . |
| 3,022,831 | 2/1962 | Hess . |
| 3,814,188 | 6/1974 | Ahne ............................ 172/7 |
| 3,869,001 | 3/1975 | Mueller, Jr. .................. 172/7 |
| 4,266,616 | 5/1981 | Mueller, Jr. .................. 172/7 |
| 4,295,530 | 10/1981 | Ashfield et al. .............. 172/7 |
| 4,411,319 | 10/1983 | Wood et al. .................. 172/10 |
| 4,497,375 | 2/1985 | Mucheyer et al. ............ 172/10 |

FOREIGN PATENT DOCUMENTS 3212342 10/1983 Fed. Rep. of Germany .......... 172/7
2120074 11/1983 United Kingdom .................... 172/7

Primary Examiner—David H. Corbin
Assistant Examiner—Jeffrey L. Thompson

[57] ABSTRACT

A draft force sensor includes a bendable shaft which extends laterally though a pair of spaced apart supports. Draft links are coupled to the ends of the shaft. A curved flexible strap is positioned between the supports and has its ends coupled to the shaft by adjustable support brackets. In a no-load condition the strap is concave in a direction facing the shaft. A displacement transducer, such as a rectilinear potentiometer, linear variable transformer or other electrical device which is sensitive to displacement, is mounted between the shaft and the central portion of the strap. The displacement transducer senses the change of distance from the shaft to the "arch" of the strap and generates an electrical signal indicative of the forces on the shaft. The load from the draft links is applied to the ends of the shaft, causing it to bend and causing the strap to flex in the opposite direction. Thus, the shaft and strap act as a mechanical amplifier. The resulting draft sensor can sense both tension and compression.

7 Claims, 4 Drawing Sheets

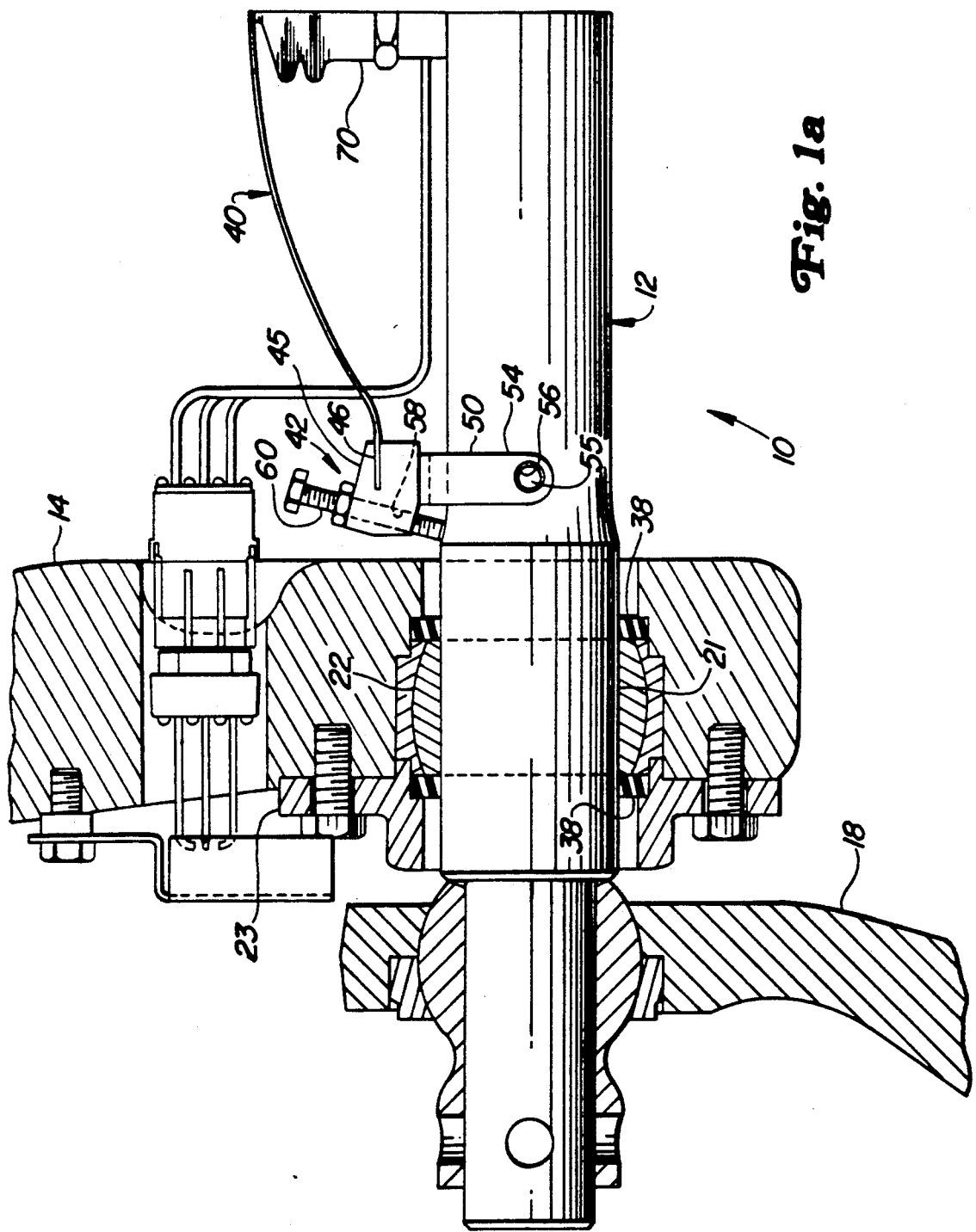

BENDING SHAFT DRAFT FORCE SENSOR

BACKGROUND OF THE INVENTION

The present invention relates to a force sensor for sensing forces, such as the draft forces applied to the implement hitch of an agricultural tractor.

To provide draft control for agricultural tractors a means of measuring the draft force is required. Known draft force measuring mechanisms for tractor draft control systems are described in U.S. Pat. No. 2,864,295, issued to Du Shane, in 1958, in U.S. Pat. No. 2,974,733, issued to Fletcher in 1961 and in U.S. Pat. No. 3,022,831, issued to Hess in 1962. In these known designs the draft force is applied to opposite ends of a bending shaft which is supported by laterally spaced apart supports. A linkage transmits the deflection of the central part of the shaft to a servo mechanism of the tractor hitch control system. However, in such designs the sensing sensitivity was limited by the stiffness and the resulting small amount of flexing of the bending shaft. Accordingly, a relatively simple, inexpensive and sensitive bending shaft type draft force sensing mechanism is desired.

SUMMARY OF THE INVENTION

One object of the present invention is to provide a simple, inexpensive and sensitive bending shaft type draft force sensor for an electronic draft control system.

Another object of the present invention is to provide such a sensor which utilizes a commercially available displacement transducer.

These and other objects are achieved by the present invention wherein a draft force sensor includes a bendable shaft which extends laterally though a pair of spaced apart supports. A draft link is coupled to each end of the shaft. A flexible strap is positioned between the supports and has its ends attached to the shaft at positions near the supports. In a no-load condition, the strap is curved and is concave in a direction facing the shaft. A displacement transducer, such as a rectilinear potentiometer, linear variable transformer or other electrical device which is sensitive to displacement, is mounted between the shaft and the central portion of the strap. The displacement transducer senses the change of distance from the shaft to the "arch" of the strap and generates an electrical signal indicative of the forces on the shaft. The load from the draft links is applied to the ends of the shaft, causing it to bend and causing the strap to flex in the opposite direction. Thus, the shaft and strap act as a mechanical amplifier. The resulting draft sensor can sense both tension and compression in the draft links.

BRIEF DESCRIPTION OF THE DRAWINGS

FIGS. 1a and 1b are views in the downward direction of left and right hand portions of a tractor bending shaft draft force sensor constructed according to the present invention;

DETAILED DESCRIPTION

Figure 1B:
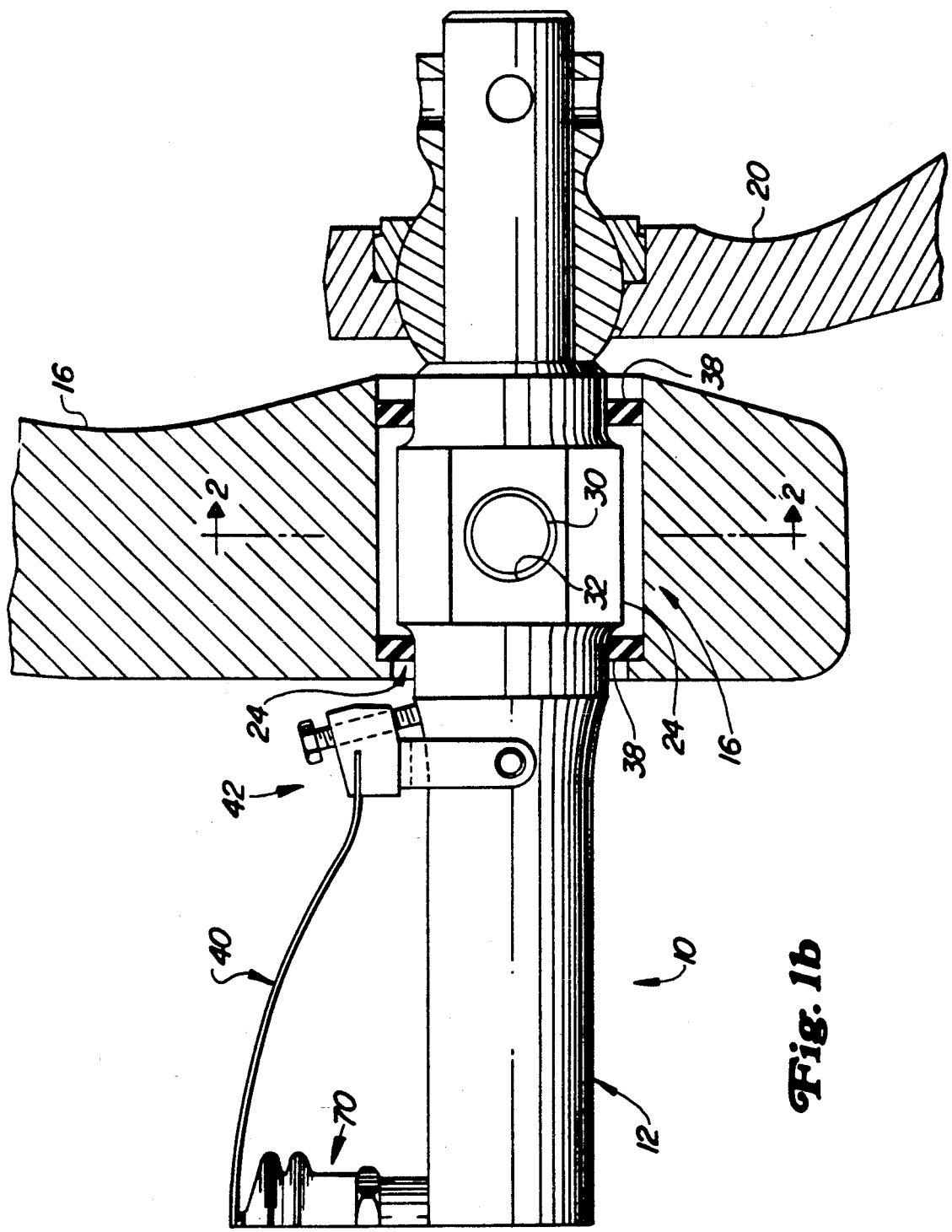
Figure 2:
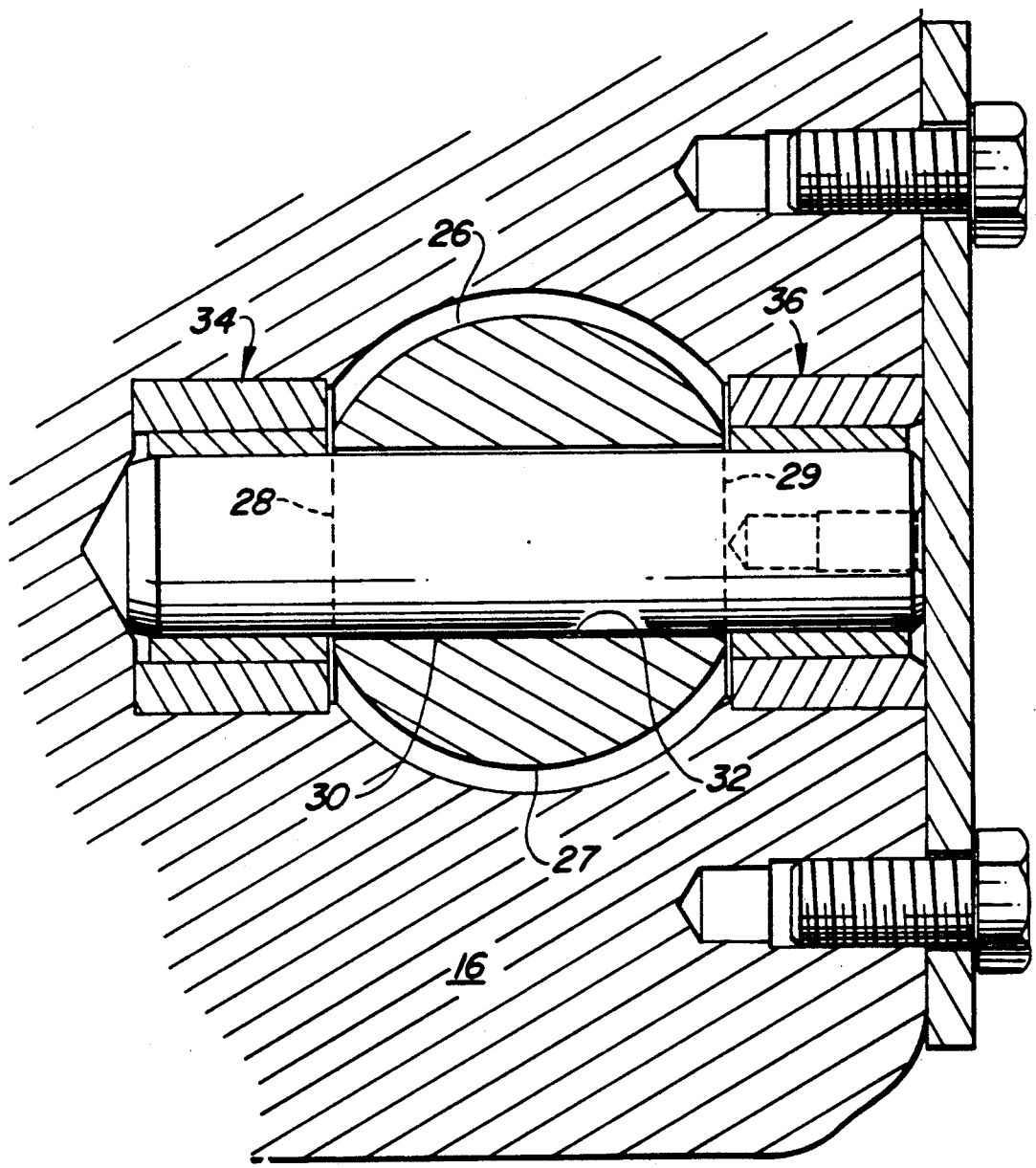
FIG. 2 is a sectional view along line 2—2 of FIG. 1b.

The draft sensor 10 includes a draft shaft or bendable shaft 12 which extends laterally through supports 14 and 16 which are formed by a frame or housing portion of the tractor to the rear of the rear axle housing (not shown). The forward ends of draft links 18,20 are coupled to opposite ends of the shaft 12 which extend laterally out from the supports 14,16. Support 14 supports an enlarged diameter portion 21 of the shaft 12 via a spherical bearing or bushing 22 which is retained in the support 14 by clamp 23. This spherical bushing 22 allows the shaft 12 to change its angular position when the pull of the draft links 18,20 tends to bend the shaft 12.

Support 16 loosely receives and supports an enlarged diameter portion 24 of the shaft 12. Enlarged diameter portion 24 has a pair of rounded cylindrical surfaces 26 and 27 separated by upper and lower horizontally extending flat surfaces 28 and 29. A cross pin 30 extends vertically through a bore 32 in portion 24 and the ends of pins 30 are contained in bushings 34,36 which are lined with a low friction material, such as "teflon" to operate with no lubrication. The bushings 34,36 at each end of the pin 30 are pressed into bores in the support 16. Ring seals 38 are mounted on both sides of both bushings 22 and 24 to protect them from contaminants.

A strap 40 has opposite ends which are anchored by strap supports 42 which are attached to the shaft 12 adjacent to and inside the supports 14,16. The strap 40 is substantially thinner, and thus more flexible than the shaft 12. When no force is applied to it, the strap 40 has a curved shape and it is concave in a direction facing the shaft 12.

Figure 3:
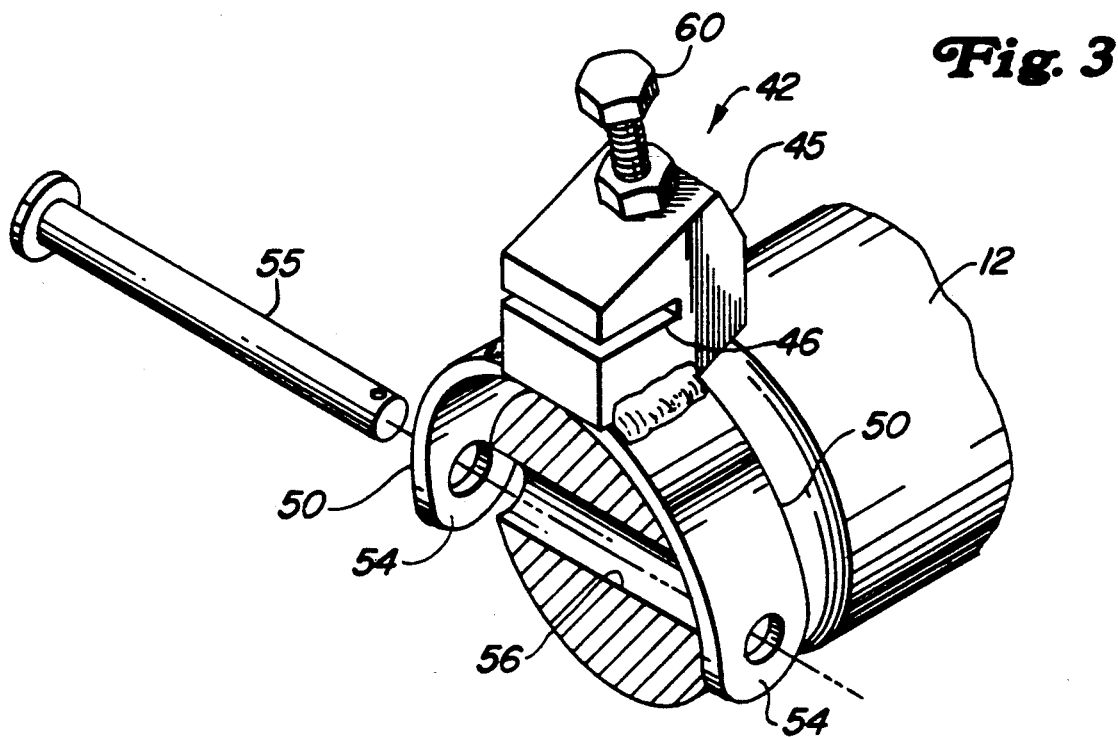
FIG. 3 is an isometric view of one embodiment of a flexible strap support bracket of the present invention.
Figure 4:
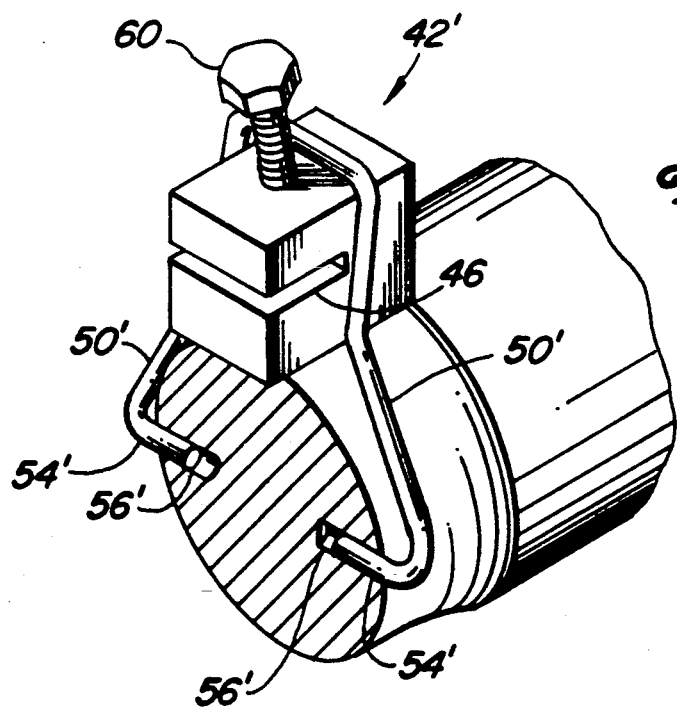
FIG. 4 is an isometric view of another embodiment of a flexible strap support bracket of the present invention.

Each strap support 42 has a body 45 with a slot 46 into which is inserted an end of the strap 40. A pair of legs 50 extend from each body 45 and grip the shaft 12. As best seen in FIGS. 1 and 3, the legs 50 may have apertured end portions 54 which are coupled to the shaft 12 by means of bolts or pins 55 which extend through mounting holes 56 which extend through the shaft 12. An alternate strap support 42', as best seen in FIG. 4, has legs 50' which have bent end portions or feet 54' which are received in shallow mounting recesses 56' in the shaft 12. In both strap support designs a threaded bore 58 extends through each body 45 at a small angle with respect to a plane which contains the center line of the legs 50. An adjustment bolt or capscrew 60 is installed in each bore 58 with an end engaging the shaft 12 so that the position of the body 45 and thus the ends of the strap 40 can be adjusted by turning the capscrew 60.

A low cost commercially available displacement transducer 70 is positioned between the shaft 12 and the central part of the strap 40. The transducer 70 may be a rectilinear potentiometer, a linear variable transformer or other electrical device which is sensitive to displacement. The draft forces transmitted to the ends of the shaft 12 by the links 18,20 will bend the shaft 12 and the flexible strap 22 will act as a mechanical amplifier. Manufacturing tolerances may result in the transducer 70 not having the right voltage output for a zero amount of draft force. Therefore, after the transducer 70 is installed the capscrews 60 are adjusted so that the transducer 70 provides an electrical "zero" output signal.

As tension is applied to the draft links 18,20 tending to pull the ends of the shaft 12 downwards viewing FIG. 1, the central part of the shaft 12 bends upwards. The strap support brackets 42 and the ends of the strap 40 move apart so that the center of the strap 40 moves closer to the center of the shaft 12. This changes the voltage output from transducer 70. This voltage signal may be applied to an input of an electronic hitch or implement control system.

Because pin 30 extends vertically, it permits pivotal bending of the shaft 12 in a horizontal plane. The pin 30 prevents the shaft 12 from rotating about its axis as the draft links 18,20 are raised and lowered and also prevents the shaft 12 from moving axially and exiting endwise from the supports 14,16. Pin 30 also absorbs the lateral loads applied to the shaft 12 as the draft links absorb side loads.

The pin 30 is a loose fit within the bore 32. When the shaft 12 bends, the pin 30 will roll within the bushings 34,36. This rolling takes place because there is much less friction between the load surfaces of the bushings 34,36 on the ends of the pin 30 than between the steel on steel contact of the pin 30 with the inner surface of bore 32. The looseness which permits rolling of the pin 30 also allows the pin to deflect due to vertical loads without the pin bottoming out until a large deflection occurs.

While the invention has been described in conjunction with a specific embodiment, it is to be understood that many alternatives, modifications, and variations will be apparent to those skilled in the art in light of the foregoing description. Accordingly, this invention is intended to embrace all such alternatives, modifications, and variations which fall within the spirit and scope of the appending claims.

I claim:

1. In a vehicle draft control system, a force sensor for sensing forces applied to a pair of laterally spaced apart draft links connected to the vehicle, the force sensor comprising:
   a pair of laterally spaced apart support members fixed to a frame of the vehicle;
   a shaft extending laterally between the support members, each end of the shaft projecting laterally beyond a corresponding one of the supports;
   means for coupling one of the draft links to each end of the shaft;
   a strap located between the supports and having a first end attached to a part of the shaft adjacent to one of the supports and a second end attached to a part of the shaft adjacent to the other of the supports, the strap being substantially more flexible than the shaft and having a central portion which moves towards and away from the shaft as the shaft bends, and the strap being curved in a no-load condition; and
   a displacement transducer for sensing changes in separation between the shaft and the central portion of the strap as the shaft bends in response to forces transmitted to it from the draft links.

2. The draft sensor of claim 1, wherein:
   a spherical bushing is mounted in one of the supports and receives a first part of the shaft, said spherical bushing permitting the first part of the shaft to pivot in the first support as the shaft bends; and
   a cross pin couples a second part of the shaft to the other support and prevents the shaft from being withdrawn from the supports.

3. The draft sensor of claim 2, wherein:
   an axis of the cross pin extends substantially perpendicular to a bending plane of the shaft.

4. The draft sensor of claim 1, wherein:
   the strap is concave in a direction facing the shaft.

5. The draft sensor of claim 1, wherein:
   at least one end of the strap is attached to a support bracket which is mounted to the shaft, the support bracket including adjusting means for adjusting the position of said at least one end of the strap with respect to the shaft.

6. The draft sensor of claim 1, further comprising:
   a support bracket having a body with slot therein for receiving one end of the strap and a pair of legs extending from the body;
   means for coupling the legs to the shaft; and
   adjusting means for adjusting the position of said one end of the strap with respect to the shaft.

7. In a vehicle draft control system, a force sensor for sensing forces applied to a pair of laterally spaced apart draft links connected to the vehicle, the force sensor comprising a laterally extending bendable shaft with ends coupled to the draft links and means for sensing bending of the shaft in response to forces transmitted to the shaft by the draft links, characterized by:
   a strap having laterally spaced apart ends attached to the shaft, the strap being substantially more flexible than the shaft and having a central portion which moves towards and away from the shaft as the shaft bends, and the strap being curved in a no-load condition; and
   a displacement transducer for sensing changes in separation between the shaft and the central portion of the strap as the shaft bends in response to forces transmitted to it from the draft links.

* * * * *